(12) United States Patent
Steiner et al.

(10) Patent No.: US 8,626,988 B2
(45) Date of Patent: Jan. 7, 2014

(54) SYSTEM AND METHOD FOR UNCODED BIT ERROR RATE EQUALIZATION VIA INTERLEAVING

(75) Inventors: Avi Steiner, Kiryat Motzkin (IL); Hanan Weingarten, Herzelia (IL)

(73) Assignee: Densbits Technologies Ltd., Haifa (IL)

( * ) Notice: Subject to any disclaimer, the term of this patent is extended or adjusted under 35 U.S.C. 154(b) by 500 days.

(21) Appl. No.: 12/942,802

(22) Filed: Nov. 9, 2010

(65) Prior Publication Data

US 2011/0119562 A1 May 19, 2011

Related U.S. Application Data

(60) Provisional application No. 61/262,571, filed on Nov. 19, 2009.

(51) Int. Cl.
*G06F 12/00* (2006.01)

(52) U.S. Cl.
USPC ............................ 711/103; 711/157; 714/773

(58) Field of Classification Search
None
See application file for complete search history.

(56) References Cited

U.S. PATENT DOCUMENTS

| | | | |
|---|---|---|---|
| 4,463,375 A | 7/1984 | Macovski | |
| 4,584,686 A | 4/1986 | Fritze | |
| 4,589,084 A | 5/1986 | Fling et al. | |
| 4,866,716 A | 9/1989 | Weng | |
| 5,077,737 A | 12/1991 | Leger et al. | |
| 5,297,153 A | 3/1994 | Baggen et al. | |
| 5,657,332 A | 8/1997 | Auclair et al. | |
| 5,729,490 A | 3/1998 | Calligaro et al. | |
| 5,793,774 A | 8/1998 | Usui et al. | |
| 5,926,409 A | 7/1999 | Engh et al. | |
| 5,956,268 A | 9/1999 | Lee | |
| 5,982,659 A | 11/1999 | Irrinki et al. | |
| 6,038,634 A | 3/2000 | Ji et al. | |
| 6,094,465 A | 7/2000 | Stein et al. | |
| 6,119,245 A | 9/2000 | Hiratsuka | |
| 6,182,261 B1 | 1/2001 | Haller et al. | |
| 6,192,497 B1 | 2/2001 | Yang et al. | |
| 6,195,287 B1 | 2/2001 | Hirano | |
| 6,199,188 B1 | 3/2001 | Shen et al. | |
| 6,209,114 B1 | 3/2001 | Wolf et al. | |
| 6,259,627 B1 | 7/2001 | Wong | |
| 6,278,633 B1 | 8/2001 | Wong et al. | |

(Continued)

OTHER PUBLICATIONS

Search Report of PCT Patent Application WO 2009/118720 A3.

(Continued)

*Primary Examiner* — Matthew Bradley
*Assistant Examiner* — Daniel Tsui
(74) *Attorney, Agent, or Firm* — Dentons US LLP (57) ABSTRACT

A device, method, and computer readable medium for programming a codeword are presented. The method includes writing a first codeword portion to portions of nonvolatile memory rows, and writing a second codeword portion to portions of nonvolatile memory rows, wherein the first group of memory rows and the second group belong to non-overlapping groups. The device includes multiple nonvolatile memory rows, and a controller receiving a codeword comprising a first codeword portion and a second codeword portion. The controller writing the first codeword portion to portions of nonvolatile memory rows, and writing the second codeword portion to portions of nonvolatile memory rows, wherein the first group of nonvolatile memory rows differs and the second group of nonvolatile memory rows belong to non-overlapping groups, and the first and second groups of memory rows belong to multiple rows. A computer readable medium having stored thereon instructions performing methods described herein.

12 Claims, 11 Drawing Sheets

(56) References Cited

U.S. PATENT DOCUMENTS

| | | |
|---|---|---|
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,290,203 B2 | 10/2007 | Emma et al. |
| 7,292,365 B2 | 11/2007 | Knox |
| 7,301,928 B2 | 11/2007 | Nakabayashi et al. |
| 7,441,067 B2 | 10/2008 | Gorobets et al. |
| 7,454,670 B2 * | 11/2008 | Kim et al. .................. 714/710 |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,697,326 B2 | 4/2010 | Sommer et al. |
| 7,706,182 B2 | 4/2010 | Shalvi et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,961,797 B1 | 6/2011 | Yang et al. |
| 8,020,073 B2 | 9/2011 | Emma et al. |
| 8,122,328 B2 | 2/2012 | Liu et al. |
| 2002/0063774 A1 | 5/2002 | Hillis et al. |
| 2002/0085419 A1 | 7/2002 | Kwon et al. |
| 2002/0154769 A1 | 10/2002 | Petersen et al. |
| 2003/0065876 A1 | 4/2003 | Lasser |
| 2003/0101404 A1 | 5/2003 | Zhao et al. |
| 2003/0105620 A1 | 6/2003 | Bowen |
| 2003/0192007 A1 | 10/2003 | Miller et al. |
| 2004/0015771 A1 | 1/2004 | Lasser et al. |
| 2004/0030971 A1 | 2/2004 | Tanaka et al. |
| 2004/0153722 A1 | 8/2004 | Lee |
| 2004/0153817 A1 | 8/2004 | Norman et al. |
| 2004/0181735 A1 | 9/2004 | Xin |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2006/0059406 A1 | 3/2006 | Micheloni et al. |
| 2006/0059409 A1 | 3/2006 | Lee |
| 2006/0064537 A1 | 3/2006 | Oshima et al. |
| 2006/0101193 A1 | 5/2006 | Murin |
| 2006/0195651 A1 * | 8/2006 | Estakhri et al. .................. 711/103 |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2008/0010581 A1 | 1/2008 | Alrod et al. |
| 2008/0028014 A1 | 1/2008 | Hilt et al. |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0148115 A1 | 6/2008 | Sokolov et al. |
| 2008/0158958 A1 | 7/2008 | Sokolov et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0219050 A1 | 9/2008 | Shalvi et al. |
| 2008/0225599 A1 | 9/2008 | Chae |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0043951 A1 | 2/2009 | Shalvi et al. |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn et al. |
| 2009/0132755 A1 * | 5/2009 | Radke .................. 711/103 |
| 2009/0144600 A1 | 6/2009 | Perlmutter et al. |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |

(56) References Cited

U.S. PATENT DOCUMENTS

| | | |
|---|---|---|
| 2009/0228761 A1 | 9/2009 | Perlmutter et al. |
| 2009/0240872 A1 | 9/2009 | Perlmutter et al. |
| 2010/0005270 A1 | 1/2010 | Jiang |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0293321 A1 | 11/2010 | Weingarten |
| 2011/0051521 A1 | 3/2011 | Levy et al. |
| 2011/0055461 A1 | 3/2011 | Steiner et al. |
| 2011/0096612 A1 | 4/2011 | Steiner et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0209028 A1* | 8/2011 | Post et al. ............... 714/758 |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |

OTHER PUBLICATIONS

Search Report of PCT Patent Application WO 2009/095902 A3.
Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.
Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.
Yani Chen, Keshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-372 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com).
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions On Electron Devices, vol. 47, No. 4, Apr. 2000.
Giovanni Campardo, Rino Micheloni, David Novosel, "VLSI—Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built In Self Diagnosis", ITC International Test Conference, Paper 2.1.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com
Paulo Cappelletti, Clara Golla, Piero Olivo, Enrico Zanoni, "Flash Memories", Kluwer Academic Publishers, 1999.
JEDEC Standard, "Stress-Test-Driven qualification of Intergrated Circuits", JEDEC Soldi State Technology Association. JEDEC Standard No. 47F pp. 1-26.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

* cited by examiner

Prior art

Prior art

SYSTEM AND METHOD FOR UNCODED BIT ERROR RATE EQUALIZATION VIA INTERLEAVING

CLAIM OF PRIORITY

This application claims the benefit of priority, under 35 U.S.C. §119, of U.S. Provisional Application No. 61/262,571, filed on Nov. 19, 2009, titled "Systems and Methods For Uncoded Bit Error Rate Equalization Via Interleaving," which is hereby incorporated in its entirety.

BACKGROUND

A nonvolatile memory module may include multiple nonvolatile memory rows and can be partitioned to odd and even nonvolatile memory pages. An odd nonvolatile memory page may include odd row portions. An even nonvolatile memory page may include even row portions. A pair of consecutive nonvolatile memory pages (one even and one odd) may include odd and even portions of the same rows.

Programming may be performed by programming an even nonvolatile memory page that may include even row portions of certain rows, and programming an odd nonvolatile memory page that may include odd row portions of these certain rows.

Figure 1:
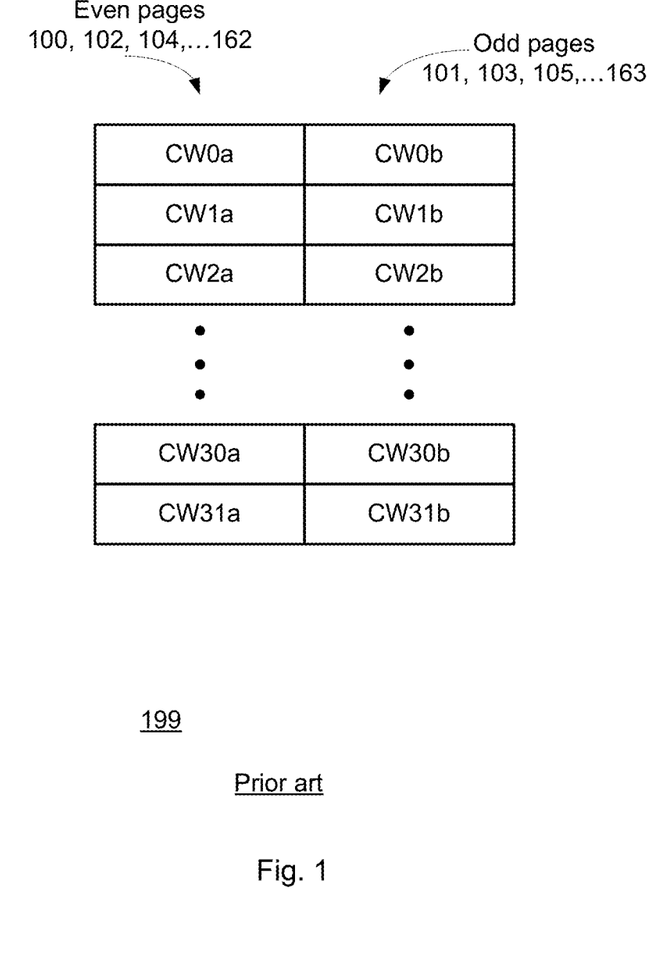
FIG. 1 depicts a prior art nonvolatile memory module writing scheme.

FIG. 1 illustrates a prior art writing scheme for nonvolatile memory module 199. The memory module may include sixty-four nonvolatile memory pages 100-163. Nonvolatile memory module 199 may include thirty-two odd nonvolatile memory pages 101, 103, 105, . . . 163, and thirty-two even nonvolatile memory pages 102, 104, 106, . . . 162. Each pair of consecutive nonvolatile memory pages (e.g., 100 and 101, 102 and 103, 104 and 105, . . . 162 and 163) may include row portions of the same rows.

With reference to FIG. 1, first codeword portion CW0a of codeword CW0 may be programmed to the first even nonvolatile memory page. A second codeword portion CW0b of CW0 may be programmed to the first odd nonvolatile memory page, where both the first even and first odd nonvolatile memory pages may include portions of the same rows. To generalize, first codeword portion CWKa of codeword CWK may be programmed to the (K+1) even nonvolatile memory page. A second codeword portion CWKb of codeword CWK may be programmed to the (K+1) odd nonvolatile memory page.

Figure 2:
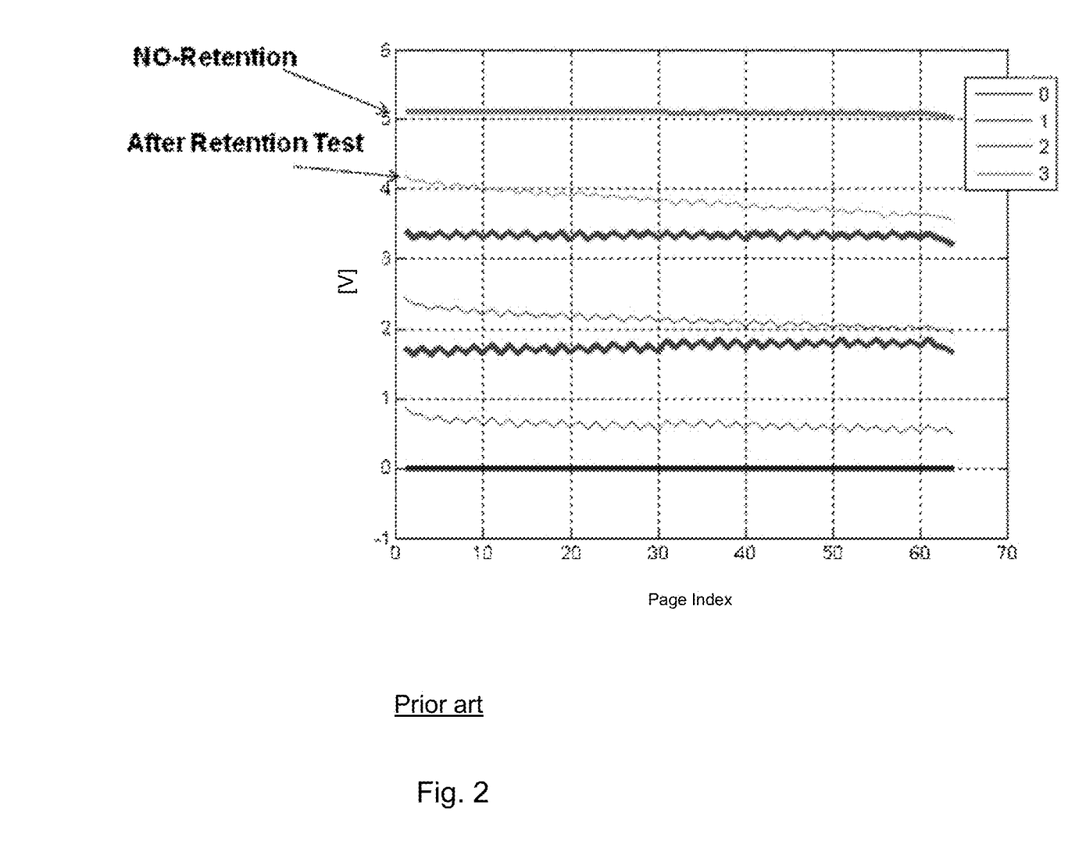
FIG. 2 depicts a graph showing differences in voltage threshold lobes in accordance with the prior art writing scheme of FIG. 1.

FIG. 2 depicts a graph showing differences in voltage threshold lobes for a 2-bit per cell memory device in accordance with the prior art writing scheme of FIG. 1. FIG. 2 illustrates that after a retention test, which may simulate the behavior of a flash memory module after a period of time, the average locations of threshold voltage lobes vary between nonvolatile memory pages. Before the retention test the average lobe threshold voltage was about equal for all nonvolatile memory pages. FIG. 2 depicts the average lobe location [V] as function of the page index, where curve 0 refers to the erase lobe, curve 1 refers to the first (lowest) non-zero lobe, and curve 4 refers to the highest voltage lobe. As may be noticed from FIG. 2, some pages suffer a large average shift due to retention, while on other pages the average shift is smaller.

Figure 3:
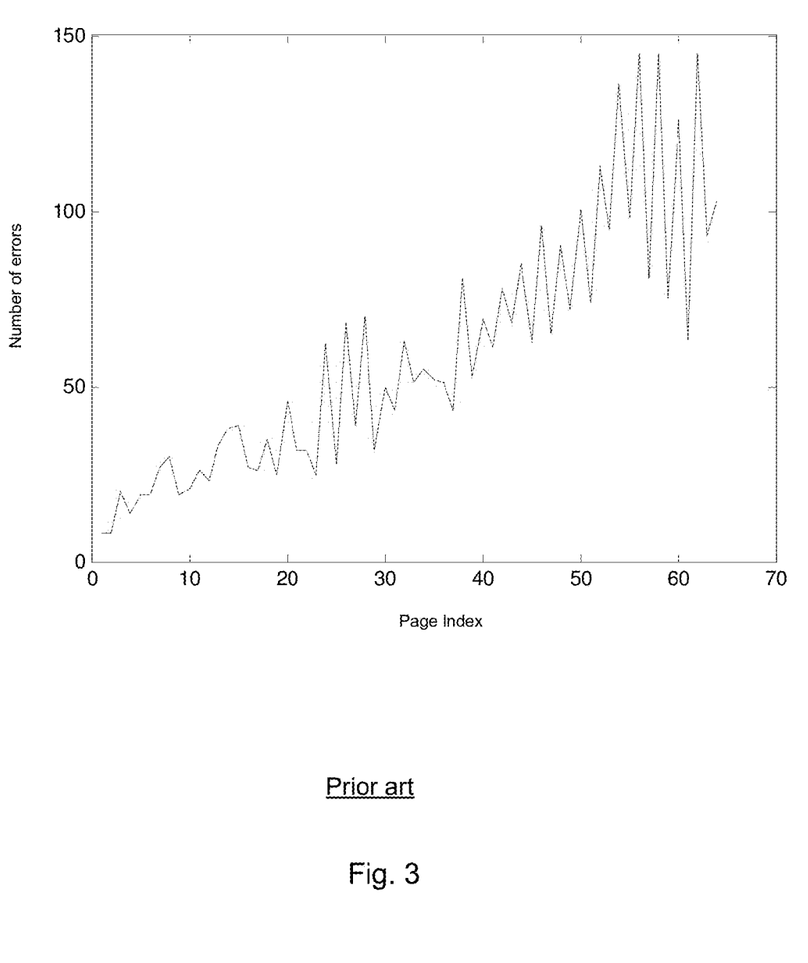
FIG. 3 depicts a graph showing the number of errors, after retention testing, in accordance with the prior art writing scheme of FIG. 1.

FIG. 3 depicts a graph showing the number of errors, after retention testing, in accordance with the prior art writing scheme of FIG. 1. The graph depicts the number of errors, after retention testing, as a function of the nonvolatile memory page index under the prior art writing scheme of FIG. 1 for least significant bit (LSB) nonvolatile memory pages of a 2-bit per cell non-volatile memory module, where the read operation is done using the optimal read thresholds per page. It may be noticed that in accordance with FIG. 2, which exemplified a variable lobe shift per page, the number of errors increases with the page index.

SUMMARY

In one embodiment the invention provides a method for programming a codeword. The method includes writing a first codeword portion to odd portions of nonvolatile memory rows of a first group of nonvolatile memory rows, and writing a second codeword portion to even portions of nonvolatile memory rows of a second group of nonvolatile memory rows, wherein the first group of nonvolatile memory rows differs from the second group of nonvolatile memory rows.

In one embodiment the invention provides a method for programming codewords. The method includes writing different portions of the codewords to at least two groups of nonvolatile memory row portions that belong to different groups of nonvolatile memory rows.

In one embodiment, the invention provides a device. The device includes multiple nonvolatile memory rows, and a controller configured to receive a codeword comprising a first codeword portion and a second codeword portion. The controller configured to write the first codeword portion to odd portions of nonvolatile memory rows of a first group of nonvolatile memory rows, and to write the second codeword portion to even portions of nonvolatile memory rows of a second group of nonvolatile memory rows, wherein the first group of nonvolatile memory rows differs from the second group of nonvolatile memory rows, and the first and second groups of nonvolatile memory rows belong to the multiple nonvolatile memory rows.

In one embodiment the invention provides a device. The device includes multiple nonvolatile memory rows; and a controller configured to receive a plurality of codewords, and to write different portions of the plurality of codewords to at least two groups of nonvolatile memory row portions that belong to different groups of nonvolatile rows.

In one embodiment, the invention provides a computer readable medium having stored thereon instructions which when executed by a processor cause the processor to perform methods in accordance with embodiments of the invention.

BRIEF DESCRIPTION OF THE DRAWINGS

Embodiments in accordance with the invention, both as to organization and method of operation, together with objects, features, and advantages thereof, may best be understood by reference to the following detailed description when read with the accompanying drawings in which.

DETAILED DESCRIPTION

In the following detailed description, numerous specific details are set forth in order to provide a thorough understanding of various embodiments in accordance with the invention. However, it will be understood by those skilled in the art that these embodiments in accordance with the invention may be practiced without these specific details. In other instances, well-known methods, procedures, and components have not been described in detail so as not to obscure embodiments in accordance with the invention.

Embodiments in accordance with the invention, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Various methods and systems may be provided for implementing an interleaved writing scheme in which a codeword may be interleaved on different portions of pages of different rows or different blocks for the nonvolatile memory. For simplicity of explanation a part of the following explanation may refer to nonvolatile memory as nonvolatile memory pages.

Different codeword portions can be written to even and odd nonvolatile memory pages that differ from each other by at least one row. The even and odd nonvolatile memory pages may even differ from each other by each of their rows. Such interleaving may result, inter alia, in equalization of the uncoded bit error rate (UBER) for codewords.

The term UBER may mean a bit error rate that can result from using nonvolatile memory rows to store information. The UBER may be uncoded in the sense that it might not be related to an encoding scheme that converts uncoded information to codewords. The UBER may provide an indication of a bit error rate without applying an error correction decoding to the codewords.

With reference to FIG. 1, for each pair of consecutive nonvolatile memory pages, the even nonvolatile memory page may be programmed before the odd nonvolatile memory page. Since even nonvolatile memory pages may often be programmed before the corresponding odd nonvolatile memory pages, the even nonvolatile memory pages may suffer from program disturbs introduced during the odd nonvolatile memory page programming. These program disturbs may be introduced after a completion of the programming of even nonvolatile memory pages and might not be compensated.

Embodiments in accordance with the invention may not be based on an assumption that the UBERs associated with different rows may be the same. Such an assumption would be inaccurate and can reduce the average supported bit error rate of the nonvolatile memory if the interleaving is performed, for example, as illustrated in prior art FIG. 1. Different rows can be characterized by different UBERs and these differences can be intensified during the lifespan of a non-volatile memory module. The different UBERs can result from an inherent physical difference. These different bit error rates can be contributed to different threshold voltage distributions.

An embodiment in accordance with the invention, may write multiple codewords to nonvolatile memory rows by a writing scheme that can be selected to minimize a worst case average UBER. The worst case UBER may be the highest UBER for any mapping between codeword portions and nonvolatile memory pages.

Figure 4:
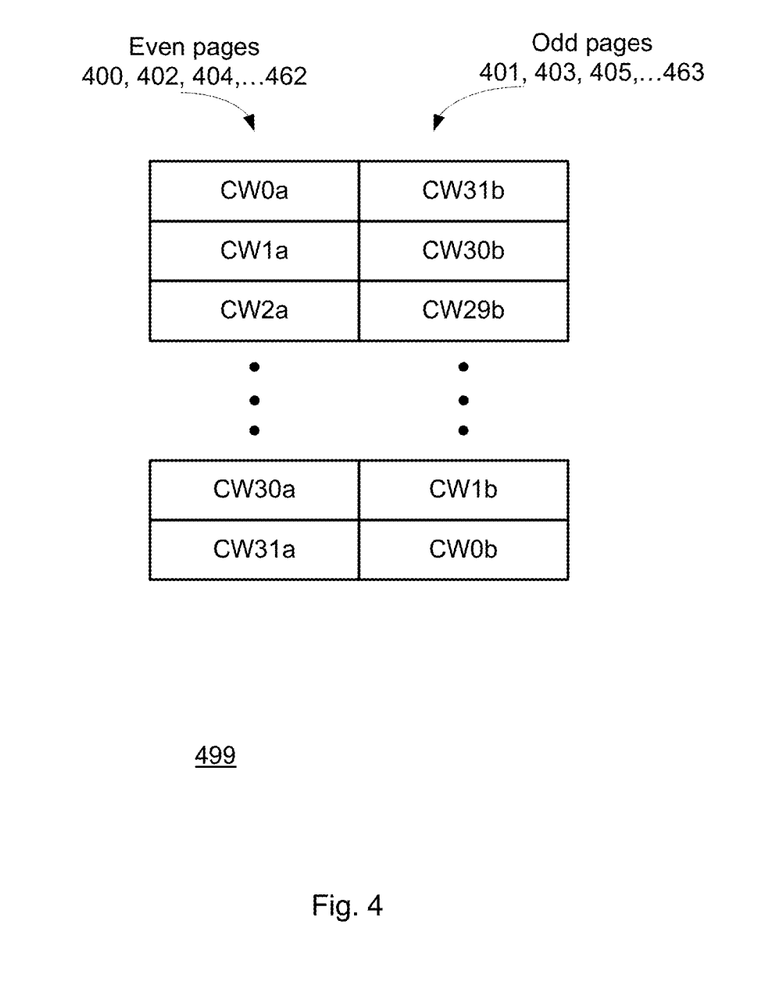
FIG. 4 depicts an interleaved writing scheme in accordance with an embodiment of the invention.

FIG. 4 depicts an interleaved writing scheme in accordance with an embodiment of the invention. Nonvolatile memory module 499 may include sixty-four nonvolatile memory pages 400-463. Nonvolatile memory module 499 may include thirty-two odd nonvolatile memory pages 401, 403, 405, . . . 463, and thirty-two even nonvolatile memory pages 402, 404, 406, . . . 462. Each pair of consecutive nonvolatile memory pages (e.g., 400 and 401, 402 and 403, 404 and 405, . . . 462 and 463) may include row portions of the same rows.

In accordance with an embodiment of the invention, different portions of the same codeword may be written to different groups of nonvolatile memory row portions that belong to different nonvolatile memory row groups. FIG. 4 illustrates a writing scheme in which each codeword has two codeword portions—one may be written to an even nonvolatile memory page and one may be written to an odd nonvolatile memory page. These odd and even nonvolatile memory pages may include different nonvolatile memory row portions.

A writing scheme in accordance with an embodiment of the invention may write codeword portions to even nonvolatile memory pages in an ascending manner. Codeword portions to odd nonvolatile memory pages may be written in a descending manner. For example, first codeword portion CW0a of codeword CW0 may be programmed to the first even nonvolatile memory page. Second codeword portion CW0b of codeword CW0 may be programmed to the last odd nonvolatile memory page. For a sixty-four page memory, the first codeword portion CWKa of codeword CWK may be programmed to the (K+1) even nonvolatile memory page. A second codeword portion CWKb of codeword CWK may be programmed to the (31-K) odd nonvolatile memory page. A writing scheme in accordance with an embodiment of the invention can equalize UBERs of different codewords when the errors monotonically increase with the nonvolatile memory row index.

Although FIG. 4 illustrates codewords that may be two nonvolatile memory pages, the writing scheme is not so limited. A codeword can be shorter or longer than two nonvolatile memory pages. For example, every encoded page pair may include multiple interleaved codewords. A writing scheme in accordance with an embodiment of the invention may write a single codeword in an interleaved manner over several odd and several even nonvolatile memory pages. A codeword can be written over more than a pair of pages of nonvolatile memory row portions in other implementations—e.g., if a group of nonvolatile memory rows were defined to be smaller than a nonvolatile memory page.

A writing scheme in accordance with an embodiment of the invention can define a mapping between codeword portions and nonvolatile memory pages. The mapping can be designed (and/or selected) according to one or more criteria. A criterion can be minimizing the UBER of one or more codewords, and/or minimizing the worst UBER of a codeword out of multiple codewords.

For example, in a block with N nonvolatile memory rows, the writing scheme can include selection of k=N/n pairs of even/odd nonvolatile memory pages, for which interleaving may minimize the UBER. Every pair may contain n even nonvolatile memory pages and n odd nonvolatile memory pages. The writing scheme (also referred to herein as "interleaving permutation"), which may determine the pairs, may be designed such that the UBER after retention testing is minimized for the worst pair. The worst pair may be defined as the set with the highest UBER out of all pairs.

The interleaving permutation writing scheme may be summarized by Equation I:

$$\Pi_{opt} = \underset{\{\Pi_j\}}{\arg\min}\max\{P_{err}(\Pi_j(i))\}_{i=1}^{k} \qquad \text{Eq. I}$$

Where k is the total number of pairs defined by k=N/n, and $\{\Pi_j\}$ is the set of legitimate permutations. The probability of error is the UBER for a given set and permutation at end of life conditions, or following a retention test.

In accordance with an embodiment of the invention, the herein disclosed systems and methods may also implement multi-die interleaving.

In accordance with an embodiment of the invention, a writing scheme can map different portions of the same codeword to different dies (e.g., different integrated circuits). In applications such as secure digital (SD) cards and/or solid state disks (SSDs) there are multiple parallel buses for simultaneous programming of multiple dies. Simultaneous programming capability may give rise to multi-die interleaving and joint encoding of multiple nonvolatile memory pages (and/or partial nonvolatile memory pages) from different dies.

Figure 5:
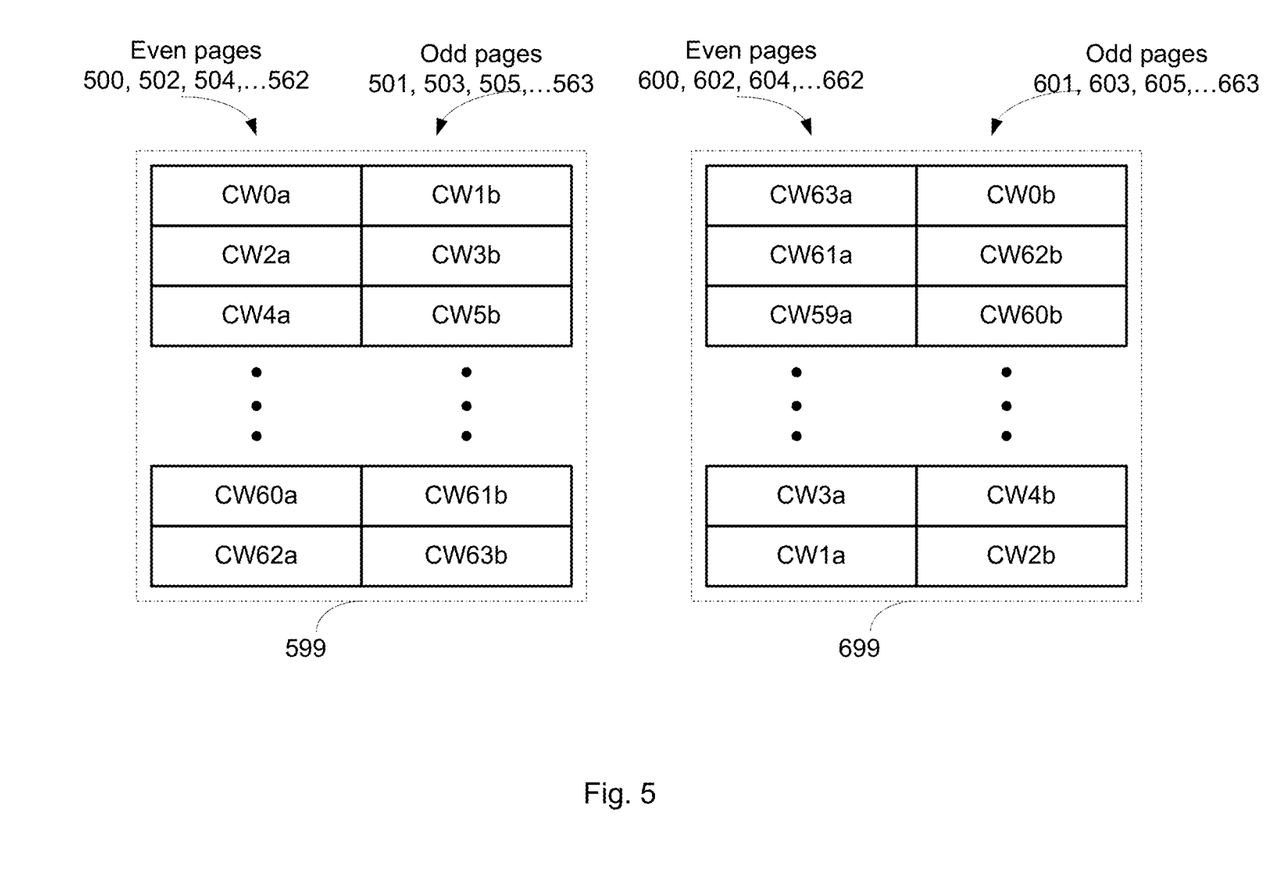
FIG. 5 depicts an interleaved writing scheme in accordance with an embodiment of the invention.

FIG. 5 depicts an interleaved writing scheme for multiple dies in accordance with an embodiment of the invention. First nonvolatile memory module 599 and second nonvolatile memory module 699, each may include sixty-four nonvolatile memory pages 500-563 and 600-663, respectively, in accordance with an embodiment of the invention. First nonvolatile memory module 599 belongs to a different integrated circuit (e.g., die) than the integrated circuit that includes second nonvolatile memory module 699.

Nonvolatile memory module 599 may include thirty-two odd nonvolatile memory pages 501, 503, 505, . . . 563, and thirty-two even nonvolatile memory pages 502, 504, 506, . . . 562. Each pair of consecutive nonvolatile memory pages (e.g., 500 and 501, 502 and 503, 504 and 505, . . . 562 and 563) may include nonvolatile memory row portions of the same rows.

Nonvolatile memory module 699 may include thirty-two odd nonvolatile memory pages 601, 603, 605, . . . 663, and thirty-two even nonvolatile memory pages 602, 604, 606, . . . 662. Each pair of consecutive nonvolatile memory pages (e.g., 600 and 601, 602 and 603, 604 and 605, . . . 662 and 663) may include nonvolatile memory row portions of the same rows.

A writing scheme in accordance with an embodiment of the invention may write different portions of the same codeword to different groups of nonvolatile memory row portions that belong to different nonvolatile memory row groups of different integrated circuits. The first codeword portion CW0a of first codeword CW0 may be written to the first even page of first nonvolatile memory module 599. The second codeword portion CW0b of first codeword CW0 may be written to the first odd page of second nonvolatile memory module 699. The odd and even pages of first nonvolatile memory module 599 may be written in an ascending order. The odd and even pages of second nonvolatile memory module 699 may be written in a descending order. In accordance with an embodiment of the invention, CW0 may be an exception for the interleaving scheme in that both portions of CW0 (i.e., CW0a and CW0b) may be written as "even" pages, i.e. written first to the row of each die. This intentional exception may allow an interleaving scheme where the CWKa are written "first" to even pages, and CWKb are written to odd pages (with even pages on the same row which are already programmed).

A portion of each (2k) codeword may be written to the odd page of first nonvolatile memory module 599. Another portion of each (2k) codeword may be written to the (64-k) even page of the second nonvolatile memory module 699. A portion of each (2k-1) codeword may be written to the k even page of first nonvolatile memory module 599. Another portion of each (2k-1) codeword may be written to the (64-p) odd page of the second nonvolatile memory module 699.

In the inter-die writing scheme described above there can be p blocks with N nonvolatile memory rows. The selected writing scheme defines the k=pN/n pairs of even/odd nonvolatile memory pages, for which interleaving minimizes the UBER.

Every pair may contain n even nonvolatile memory pages and n odd nonvolatile memory pages. With multi-die interleaving the n nonvolatile memory pages may belong to different dies. If for example n=2p, then every two pairs may belong to different dies. The interleaving permutation, which determines the pairs, may be designed such that the UBER after retention testing may be minimized for the worst set.

This may be summarized in Equation II:

$$\Pi_{opt} = \underset{\{\Pi_j\}}{\arg\min}\max\{P_{err}(\Pi_j(i))\}_{i=1}^{k=pN/n} \qquad \text{Eq. II}$$

Where k is the total number of sets defined by k=pN/n, and $\{\Pi_j\}$ is the set of possible permutations. The probability of error may be the UBER for a given set and permutation at end of life conditions, or following a retention test.

Figure 6:
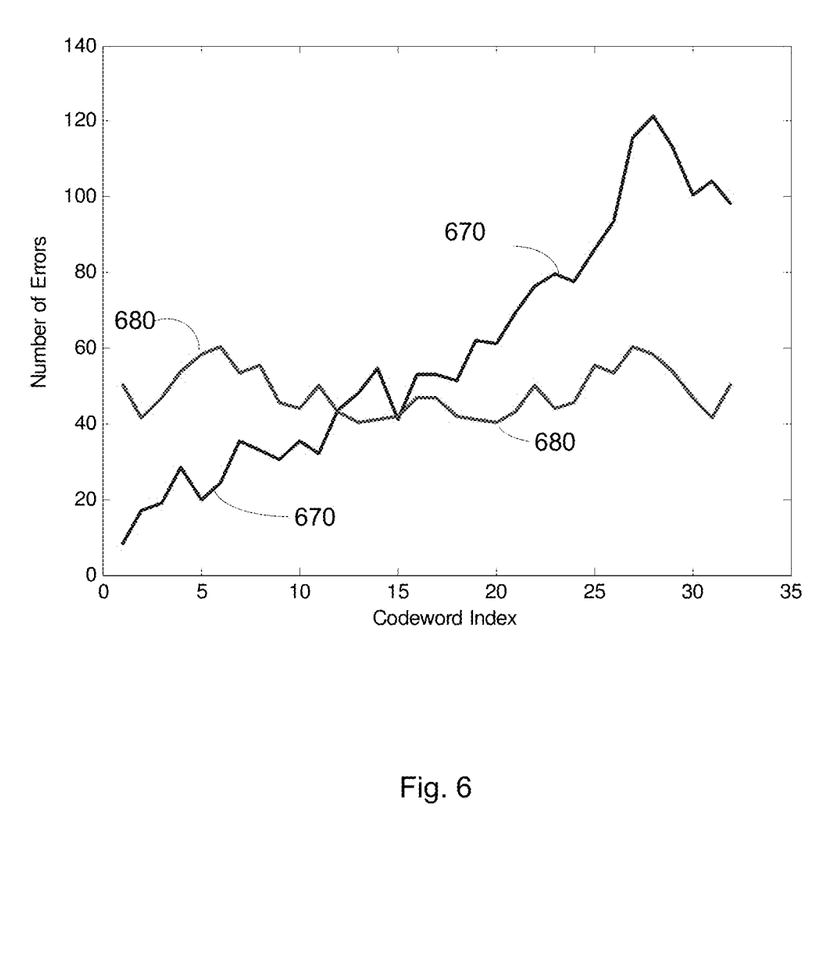
FIG. 6 depicts a graph of uncoded error distribution per codeword in accordance with an embodiment of the invention.

FIG. 6 depicts a graph of uncoded error distribution per codeword in accordance with an embodiment of the invention juxtaposed with a graph of uncoded error distribution for a prior art writing scheme. Curve 680 may be an uncoded error distribution per codeword in accordance with an embodiment of the invention. As can be seen in FIG. 6, the number of errors for the uncoded error distribution per codeword in accordance with an embodiment of the invention remains within a narrow window and does not increase with the codeword index. Curve 670 represents an uncoded error distribution for the prior art writing scheme, where every codeword is programmed to consecutive even/odd pages (i.e. on the same row). The number of errors from the prior art writing scheme increases steeply with increased codeword index.

Figure 7:
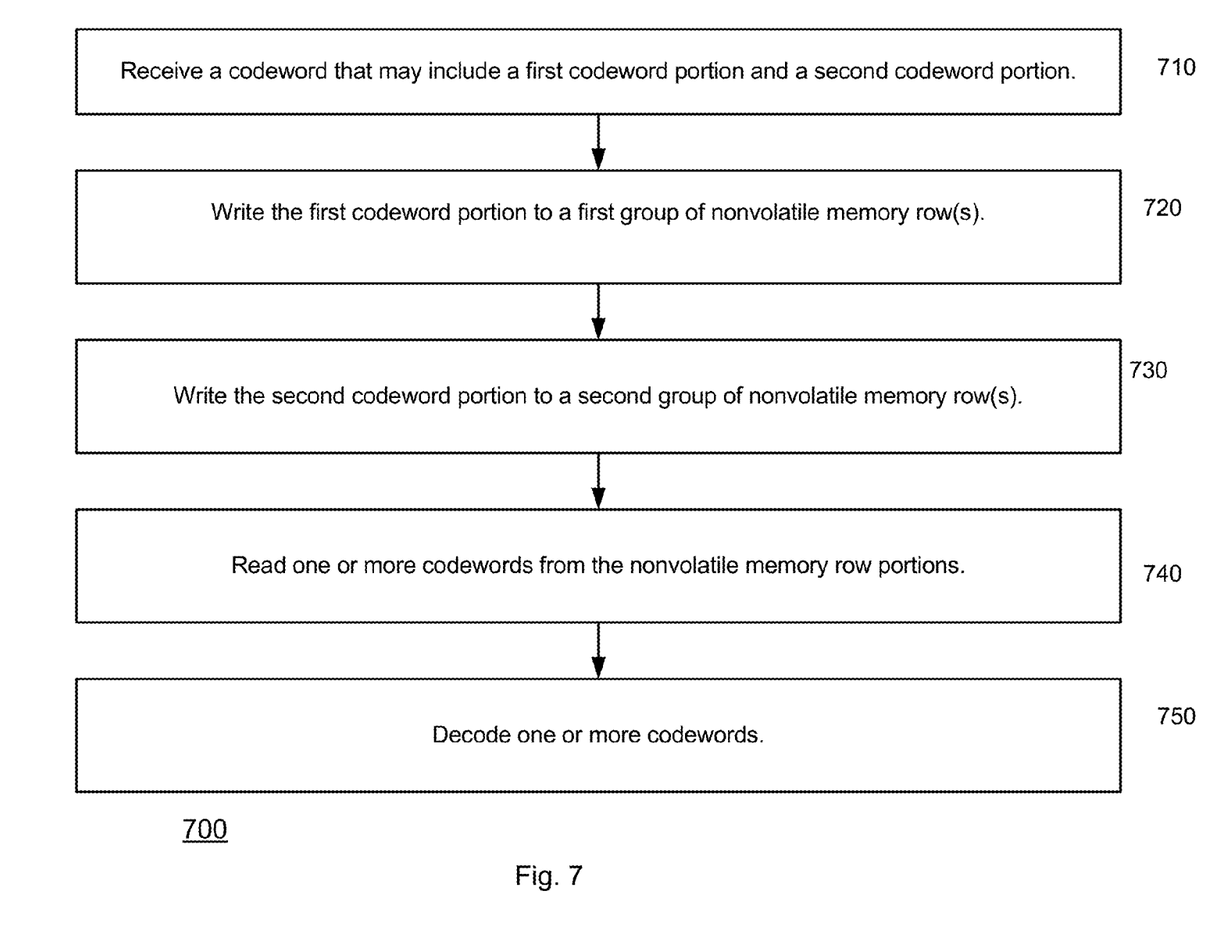
FIG. 7 depicts a method in accordance with an embodiment of the invention.

FIG. 7 illustrates method 700 for programming a codeword, in accordance with an embodiment of the invention. Method 700 may receive, step 710, a codeword that may include a first codeword portion and a second codeword portion. According to an embodiment of the invention step 710 can include receiving information to be decoded and encoding it to provide the codeword. The codeword and the information can be stored in a buffer before the codeword is written to the nonvolatile memory rows.

Step 720 may include writing the first codeword portion to even portions of nonvolatile memory row(s) of a first group of nonvolatile memory row(s). Step 730 may include writing the second codeword portion to odd portions of nonvolatile memory rows of a second group of nonvolatile memory row(s). It may be typical that even pages are programmed first, and odd pages afterwards. However there may be exceptions, as exemplified in FIG. 11, where both portions of CW0 are written to even pages, e.g., CW0a to die 0:page 0, and CW0b to die 1:page 0 (as described below).

The first group of nonvolatile memory rows may differ from the second group of nonvolatile memory rows. The first group of nonvolatile memory rows and the second group of nonvolatile memory rows can be completely different from each other. It is noted that some overlap between these groups may be allowed. Each of the first and second groups of nonvolatile memory rows may include an integer multiple (1, 2, 3, and so on) of a nonvolatile memory page.

The first group of nonvolatile memory rows can belong to a first integrated circuit and the second group of nonvolatile memory rows can belong to a second integrated circuit that may differ from the first integrated circuit.

Method 700 may read, step 740, one or more codewords from the nonvolatile memory row portions. One or more codewords may be decoded, step 750. In one implementation the codeword(s) may be decoded by applying an error correction decoding scheme.

Figure 8:
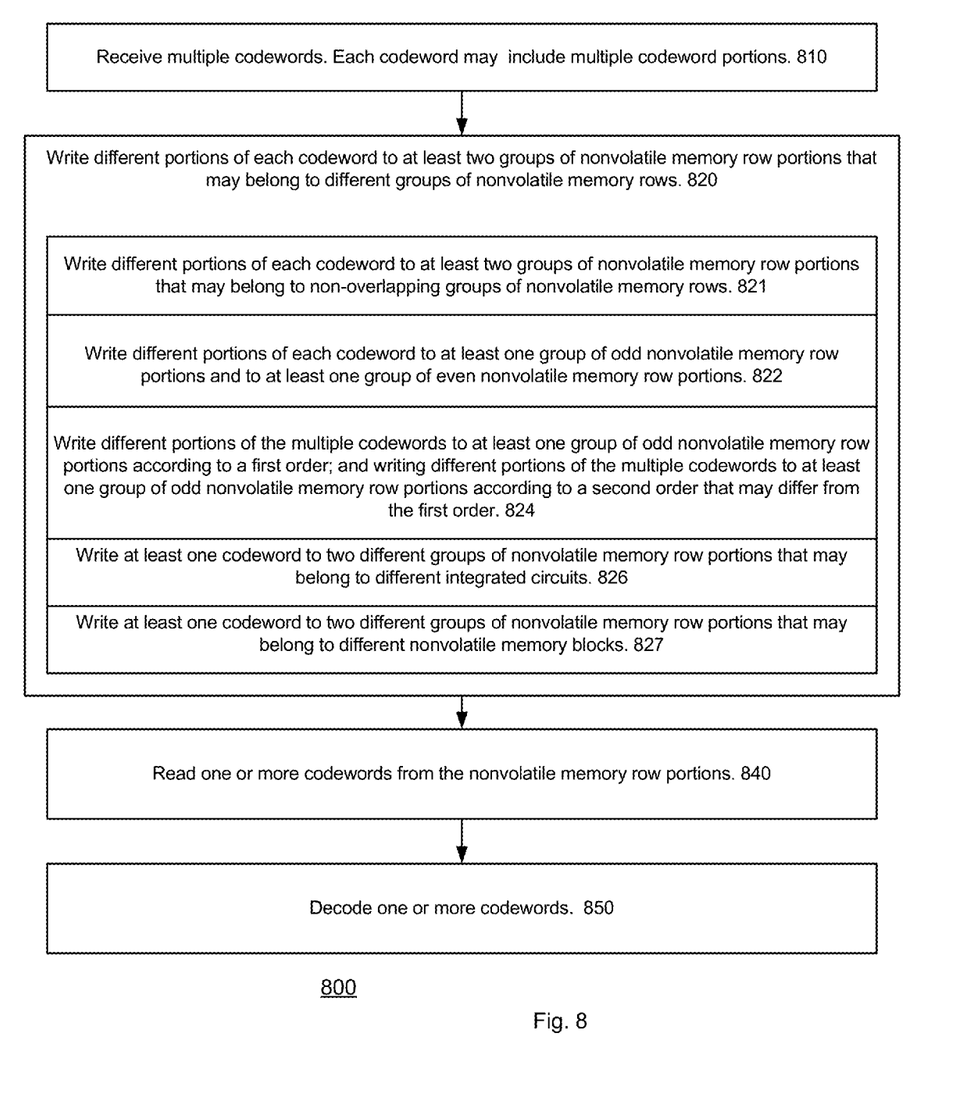
FIG. 8 depicts a method in accordance with an embodiment of the invention.

FIG. 8 illustrates method 800 for programming multiple codewords in accordance with an embodiment of the invention. Method 800 may receive, step 810, multiple codewords. Each codeword may include multiple codeword portions. In accordance with an embodiment of the invention, step 810 can include receiving multiple information entities and/or units to be decoded and encoding them to provide the multiple codewords. The multiple codewords and/or, the information units can be stored in a buffer before the multiple codewords are written to the nonvolatile memory rows.

In one embodiment in accordance with the invention, the multiple codewords can be interleaved before step 820. The multiple codewords can be written to the nonvolatile memory row portions in an interleaved manner (for example by writing different portions of a codeword to different pages/blocks/dies).

Method 800 may write, step 820, different portions of each codeword to at least two groups of nonvolatile memory row portions that may belong to different groups of nonvolatile memory rows. A first portion of a certain codeword may be written to a first group of nonvolatile memory row portions that may belong to a first group of nonvolatile memory rows. A second portion of the certain codeword may be written to a second group of nonvolatile memory row portions that may belong to a second group of nonvolatile memory rows that may differ from the first group of nonvolatile memory rows.

In an embodiment in accordance with the invention, step 820 can include writing, step 821, different portions of one or more codeword to at least two groups of nonvolatile memory row portions that may belong to non-overlapping groups of nonvolatile memory rows.

In an embodiment in accordance with the invention, step 820 can include writing one or more codeword portions to even portions of certain nonvolatile memory rows (e.g., even nonvolatile memory pages) and writing other codeword portions to odd portions of other nonvolatile memory rows (e.g., odd nonvolatile memory pages that may belong to different nonvolatile memory rows).

Accordingly, step 820 can include writing, step 822, different portions of each codeword to at least one group of odd nonvolatile memory row portions and to at least one group of even nonvolatile memory row portions. The at least one group of odd nonvolatile memory row portions and the at least one group of even nonvolatile memory row portions may belong to different groups of nonvolatile memory rows.

Writing to odd portions of nonvolatile memory rows and to even nonvolatile memory pages can include applying the same (or different) schemes for odd and even portions. In an embodiment in accordance with the invention, step 820 can include writing, step 824, different portions of the multiple codewords to at least one group of odd nonvolatile memory row portions according to a first order; and writing different portions of the multiple codewords to at least one group of odd nonvolatile memory row portions according to a second order that may differ from the first order.

The second order can be opposite to the first order as illustrated by FIG. 4. As discussed above, FIG. 4 illustrates codeword portions that may be written to even nonvolatile memory pages in an ascending manner, and writing codeword portions to odd nonvolatile memory pages in a descending manner.

In an embodiment in accordance with the invention, step 820 may include a multi-die writing scheme that may include writing, step 826, at least one codeword to two different groups of nonvolatile memory row portions that may belong to different integrated circuits. As discussed above, FIG. 5 illustrates a multiple-die writing scheme in which different portions of a codeword may be written to different portions of nonvolatile memory rows that may belong to different integrated circuits.

In an embodiment in accordance with the invention, step 820 can include writing, step 827, at least one codeword to two different groups of nonvolatile memory row portions that may belong to different nonvolatile memory blocks.

In an embodiment in accordance with the invention, method 800 may include reading, step 840, one or more codewords from the nonvolatile memory row portions. Method 800 may also include decoding, step 850, one or more codewords. In one implementation the codeword(s) may be decoded by applying an error correction decoding scheme.

Figure 9:
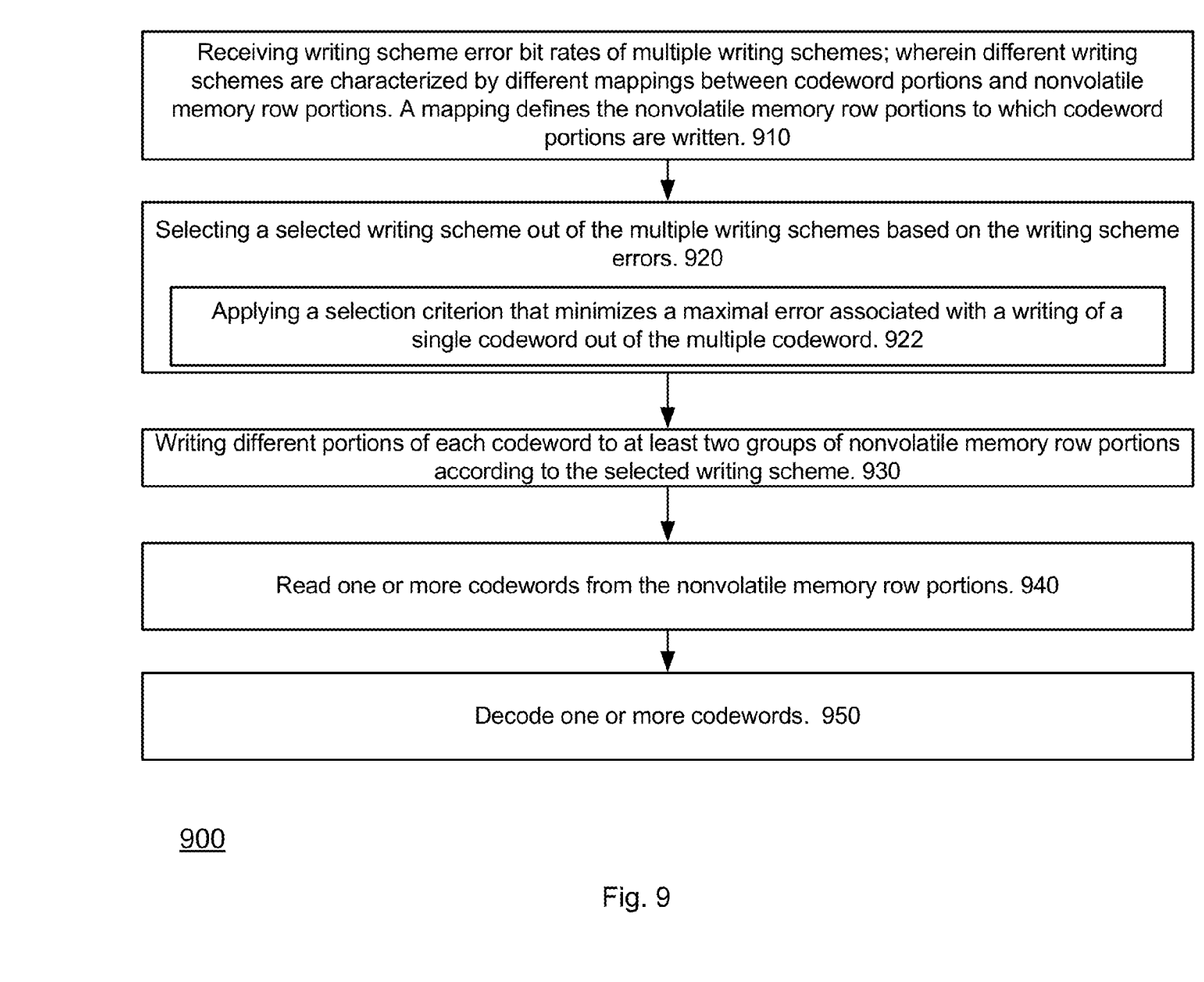
FIG. 9 depicts a method in accordance with an embodiment of the invention.

FIG. 9 illustrates method 900 for programming a codeword in accordance with an embodiment of the invention. Method 900 may receive, step 910, writing scheme bit error rates of multiple writing schemes. Different writing schemes may be characterized by different mappings between codeword portions and nonvolatile memory row portions. A mapping may define the nonvolatile memory row portions to which codeword portions are written.

Method 900 may select, step 920, a selected writing scheme out of the multiple writing schemes based on the writing scheme errors. In an embodiment in accordance with the invention, step 920 can include applying, step 922, a selection criterion that may minimize a maximal error associated with a writing of a single codeword out of the multiple codeword.

Method 900 may include writing, step 930, different portions of each codeword to at least two groups of nonvolatile memory row portions according to a selected writing scheme. The two groups of nonvolatile memory row portions may belong to different groups of nonvolatile memory rows. A first portion of a certain codeword may be written to a first group of nonvolatile memory row portions that may belong to a first group of nonvolatile memory rows. A second portion of the certain codeword may be written to a second group of nonvolatile memory row portions that may belong to a second group of nonvolatile memory rows that may differ from the first group of nonvolatile memory rows.

Steps 910 and 920 can be repeated multiple times during the lifespan of the nonvolatile memory device. The repetition can account for changes in the bit error rates.

In an embodiment in accordance with the invention, method 900 may include reading, step 940, one or more codewords from the nonvolatile memory row portions. Method 900 may also include decoding, step 950, one or more codewords. In one implementation the codeword(s) may be decoded by applying an error correction decoding scheme.

Figure 10:
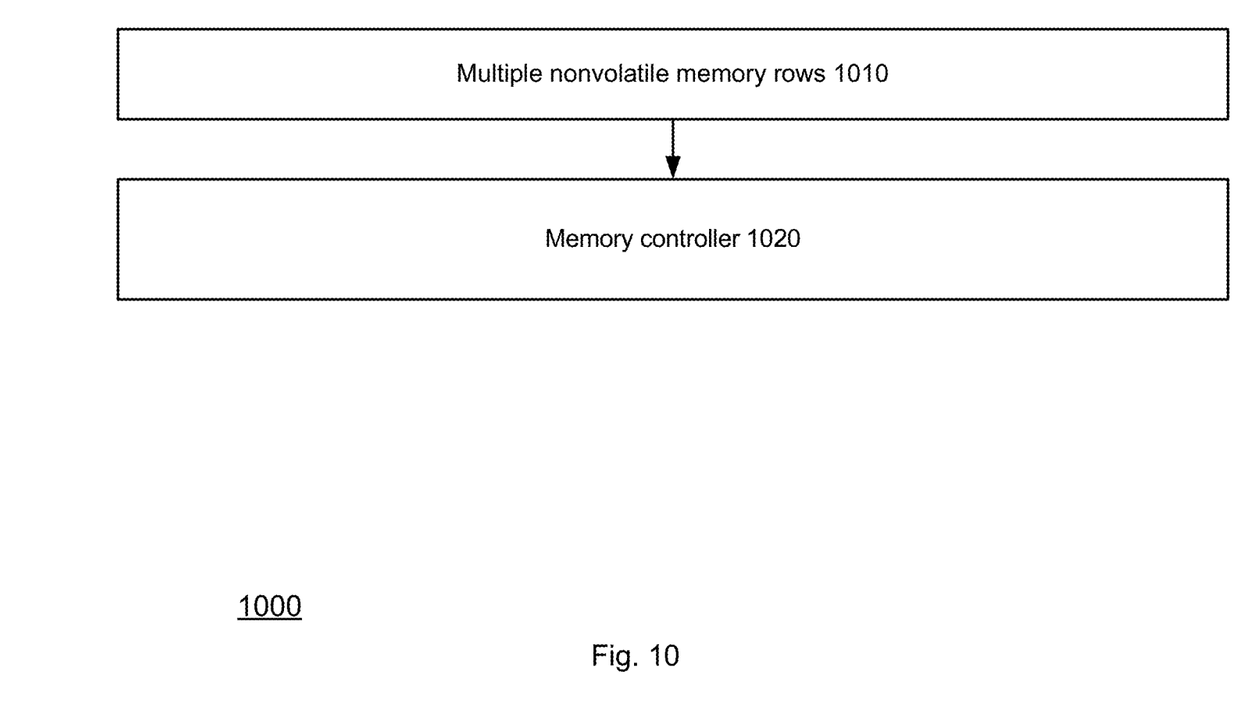
FIG. 10 depicts a device in accordance with an embodiment of the invention.

FIG. 10 illustrates device 1000 according to an embodiment of the invention. Device 1000 may include multiple nonvolatile memory rows 1010 and memory controller 1020. Multiple nonvolatile memory rows 1010 can belong to one or more integrated circuits, to one or more erase blocks, etc. For example, FIG. 4 illustrates an example in which the multiple nonvolatile memory rows may belong to a single integrated circuit. FIG. 5 illustrates an example in which the multiple nonvolatile memory rows may belong to a pair of integrated circuits.

Memory controller 1020 may receive a codeword that may include a first codeword portion and a second codeword portion. Memory controller 1020 may write the first codeword portion to odd portions of nonvolatile memory rows of a first group of nonvolatile memory rows; and may write the second codeword portion to even portions of nonvolatile memory rows of a second group of nonvolatile memory rows.

The first group of nonvolatile memory rows may differ from the second group of nonvolatile memory rows. Each nonvolatile memory row of the first group of nonvolatile memory rows can differ from each nonvolatile memory row of the second group of nonvolatile memory rows. An example of this difference is illustrated in FIGS. 4 and 5.

Memory controller 1020 can receive multiple codewords and may write different portions of each codeword to at least two groups of nonvolatile memory row portions that may belong to different groups of nonvolatile rows. Memory controller 1020 can write different portions of each codeword to at least two groups of nonvolatile memory row portions that may belong to non-overlapping groups of nonvolatile memory rows.

Memory controller 1020 can write different portions of each codeword to at least one group of odd nonvolatile memory row portions and to at least one group of even nonvolatile memory row portions, The at least one group of odd nonvolatile memory row portions and the at least one group of even nonvolatile memory row portions may belong to different groups of nonvolatile memory rows.

Memory controller 1020 can write different portions of the multiple codewords to at least one group of odd nonvolatile memory row portions according to a first order, and write different portions of the multiple codewords to at least one group of odd nonvolatile memory row portions according to a second order that may differ from the first order.

Memory controller 1020 can write different portions of the multiple codewords to at least one group of odd nonvolatile memory row portions according to a first order; write different portions of the multiple codewords to at least one group of odd nonvolatile memory row portions according to a second order that may be opposite to the first order.

Memory controller 1020 can write at least one codeword to two different groups of nonvolatile memory row portions that may belong to different integrated circuits. Memory controller 1020 can write at least one codeword to two different groups of nonvolatile memory row portions that may belong to different nonvolatile memory erase blocks.

Memory controller 1020 can receive writing scheme bit error rates of multiple writing schemes. These multiple writing schemes may be different mappings between codeword portions and nonvolatile memory portions. Memory controller 1020 can select a selected writing scheme out of the multiple writing schemes based on the writing scheme errors, and write different portions of each codeword to at least two groups of nonvolatile memory row portions according to the selected writing scheme.

Memory controller 1020 can write different portions of each codeword to at least two groups of nonvolatile memory row portions according to a selected writing scheme provided to the device. The selection between writing schemes can be performed by a test device, or another system that differs from device 1000.

The memory controller 1020 can select the selected writing scheme by applying a selection criterion that may minimize a maximal error associated with a writing of a single codeword out of the multiple codeword.

Figure 11:
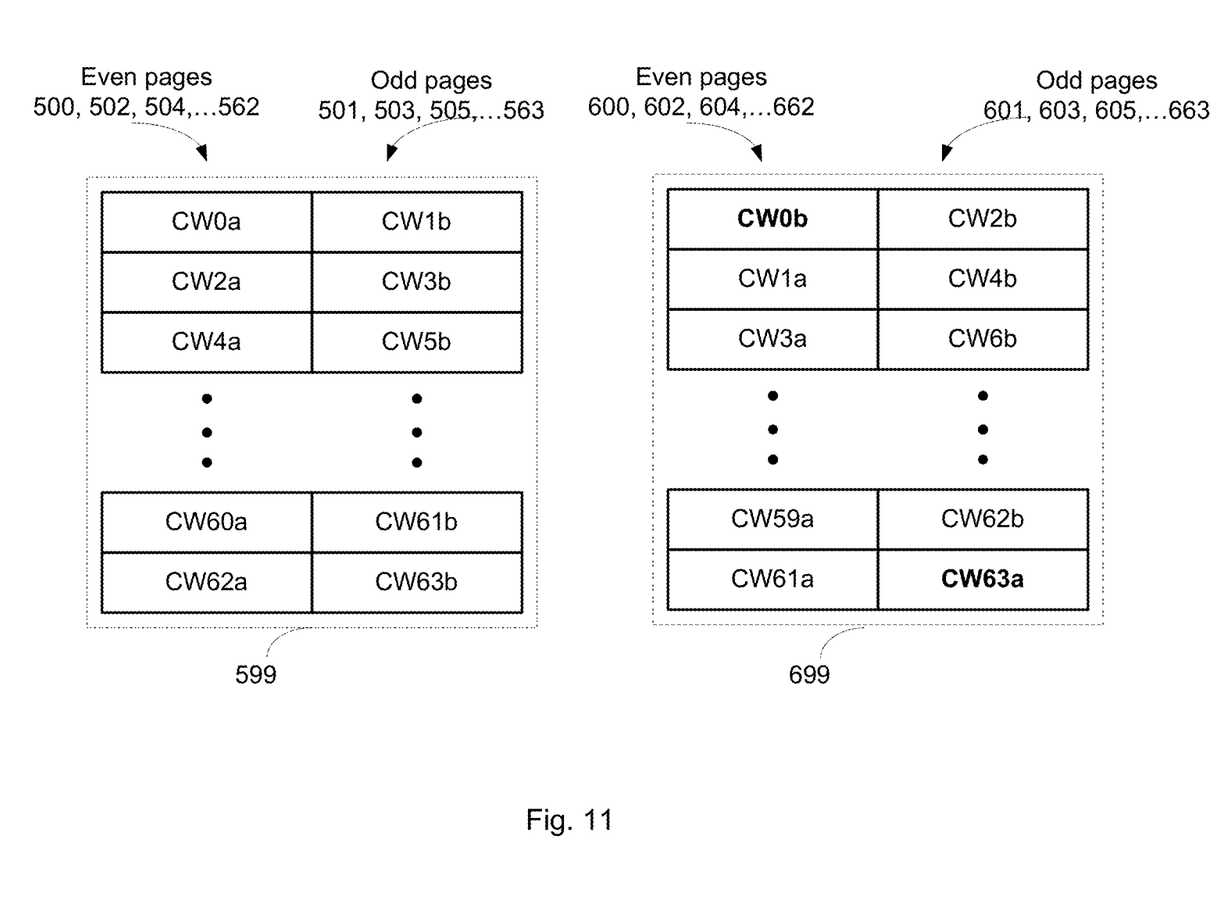
FIG. 11 depicts an interleaved writing scheme in accordance with an embodiment of the invention.

FIG. 11 depicts an interleaved writing scheme for multiple dies in accordance with an embodiment of the invention. The interleaved writing scheme depicted in FIG. 11 may be implemented in multiple dies, for example the multiple dies of first nonvolatile memory module 599 and second nonvolatile memory module 699 depicted in FIG. 5. Each of nonvolatile memory modules 599, 699 may include sixty-four nonvolatile memory pages 500-563 and 600-663, respectively, in accordance with an embodiment of the invention. First nonvolatile memory module 599 belongs to a different integrated circuit (e.g., die) than the integrated circuit that includes second nonvolatile memory module 699.

Nonvolatile memory module 599 may include thirty-two odd nonvolatile memory pages 501, 503, 505, . . . 563, and thirty-two even nonvolatile memory pages 502, 504, 506, . . . 562. Each pair of consecutive nonvolatile memory pages (e.g., 500 and 501, 502 and 503, 504 and 505, . . . 562 and 563) may include nonvolatile memory row portions of the same rows.

Nonvolatile memory module 699 may include thirty-two odd nonvolatile memory pages 601, 603, 605, . . . 663, and thirty-two even nonvolatile memory pages 602, 604, 606, . . . 662. Each pair of consecutive nonvolatile memory pages (e.g., 600 and 601, 602 and 603, 604 and 605, . . . 662 and 663) may include nonvolatile memory row portions of the same rows.

As illustrated in FIG. 11, a writing scheme in accordance with an embodiment of the invention may write different portions of the same codeword to different groups of nonvolatile memory row portions that belong to different nonvolatile memory row groups of different integrated circuits. The first codeword portion CW0a of first codeword CW0 may be written to the first even page of first nonvolatile memory module 599. The second codeword portion CW0b of first codeword CW0 may be written to the first even page of second nonvolatile memory module 699. The odd and even pages of first nonvolatile memory module 599 may be written in an ascending order.

Any of the mentioned above methods or any combination of their steps can be executed by a computer that retrieves instructions from a non-transitory computer readable medium. The computer readable medium can be a physical computer readable medium such as a disk, diskette, CD ROM, tape, integrated circuit, memory module, microchip, RFID tag, etc. For example, memory controller 1020 can retrieve instructions from a computer readable medium such as instruction memory module 1030.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for programming codewords having at least two codeword portions, the method comprising: writing different portions of the codewords to at least two groups of nonvolatile memory row portions that belong to non-overlapping groups of nonvolatile memory rows; wherein the writing comprises writing first different portions of the codewords to at least one group of odd nonvolatile memory row portions in a first order; and writing second different portions of the codewords to at least one group of even nonvolatile memory row portions in a second order, the second order differing from the first order.

2. The method of claim 1, wherein the second order being in an opposite order to the first order.

3. The method of claim 1, wherein the at least one group of odd nonvolatile memory row portions and the at least one group of even nonvolatile row portions belong to different integrated circuits.

4. The method of claim 1, wherein the at least one group of odd nonvolatile memory row portions and the at least one group of even nonvolatile row portions belong to different nonvolatile memory erase blocks.

5. A device, comprising: multiple nonvolatile memory rows; and a controller configured to receive a plurality of codewords, and to write different portions of the plurality of codewords to at least two groups of nonvolatile memory row portions that belong to non-overlapping different groups of nonvolatile rows; wherein the controller is configured to: write first different portions of the plurality of codewords to at least one group of odd nonvolatile memory row portions in a first order; and write second different portions of the plurality of codewords to at least one group of even nonvolatile memory row portions in a second order.

6. The device of claim 5, wherein the second order being in an opposite order to the first order.

7. The device of claim 5, wherein the at least one group of odd nonvolatile memory row portions and the at least one group of even nonvolatile row portions belong to different integrated circuits.

8. The device of claim 5, wherein the at least one group of odd nonvolatile memory row portions and the at least one group of even nonvolatile row portions belong to different nonvolatile memory erase blocks.

9. A non-transitory computer readable medium having stored thereon instructions which when executed by a processor cause the processor to perform the method of: receiving a plurality of codewords; and writing different portions of the plurality of codewords to at least two groups of nonvolatile memory row portions that belong to different groups of non-overlapping nonvolatile memory rows; wherein the writing comprises writing different portions of the plurality of codewords to at least one group of odd nonvolatile memory row portions of a first order; and writing different portions of the plurality of codewords to at least one group of even nonvolatile memory row portions of a second order, the second order differing from the first order.

10. The non-transitory computer readable medium of claim 9, wherein the at least one group of odd nonvolatile memory row portions and the at least one group of even nonvolatile row portions belong to different integrated circuits.

11. The non-transitory computer readable medium of claim 9, wherein the at least one group of odd nonvolatile memory row portions and the at least one group of even nonvolatile row portions belong to different nonvolatile memory erase blocks.

12. The non-transitory computer readable medium of claim 9, wherein the second order being in an opposite order to the first order.

* * * * *